(12) United States Patent
Standefer, III et al.

(10) Patent No.: US 10,924,467 B2
(45) Date of Patent: Feb. 16, 2021

(54) DELEGATED AUTHORIZATION FOR ISOLATED COLLECTIONS

(71) Applicant: Microsoft Technology Licensing, LLC, Redmond, WA (US)

(72) Inventors: Robert Standefer, III, Duvall, WA (US); Christopher L. Mullins, Sammamish, WA (US); Henrik Frystyk Nielsen, Hunts Point, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 176 days.

(21) Appl. No.: 15/344,229

(22) Filed: Nov. 4, 2016

(65) Prior Publication Data

US 2018/0131684 A1 May 10, 2018

(51) Int. Cl.
*G06F 3/06* (2006.01)
*G06F 21/60* (2013.01)
(Continued)

(52) U.S. Cl.
CPC ........ *H04L 63/0815* (2013.01); *G06F 3/0622* (2013.01); *G06F 16/9535* (2019.01);
(Continued)

(58) Field of Classification Search
CPC .............. G06F 21/6218; G06F 21/604; G06F 2221/2141; G06F 3/0622; G06F 16/9535;
(Continued)

(56) References Cited

U.S. PATENT DOCUMENTS 6,848,000 B1 * 1/2005 Reynolds ................ H04L 29/06
709/203
7,010,568 B1 * 3/2006 Schneider ......... G06F 17/30887
707/999.003

(Continued)

FOREIGN PATENT DOCUMENTS

CN 105991614 A 10/2016

OTHER PUBLICATIONS

"Setting Access Controls on Files, Folders, Shares, and Other System Objects in Windows 2000," (Jun. 19, 2009 version) accessible at https://web.archive.org/web/20090619104230/https://technet.microsoft.com/en-us/library/dd277411.aspx.*

(Continued)

*Primary Examiner* — Alexander Lagor
*Assistant Examiner* — Howard H. Louie

(57) ABSTRACT

Examples of the present disclosure describe systems and methods of delegating authorization to access isolated collections of data. In aspects, a request to access an isolated collection of resource identifiers and relationships may be received by an application. The resource identifiers may correspond to resources in one or more remote data repositories. Upon receiving the request, the application may interrogate a remote data repository to determine whether the requestor is currently authorized to access the one or more resources corresponding to the resource identifiers in the isolated collection. If the requestor is determined to be authorized, the application may use an authorization indication provided by the remote data repository to provide the requestor with access to the isolated collection. If the requestor is determined to be unauthorized, the application may prohibit access to the isolated collection.

20 Claims, 14 Drawing Sheets

(51) Int. Cl.
*H04L 12/24* (2006.01)
*G06F 21/62* (2013.01)
*H04L 29/06* (2006.01)
*G06F 16/9535* (2019.01)
*G06F 21/10* (2013.01)

(52) U.S. Cl.
CPC ............ *G06F 21/10* (2013.01); *G06F 21/604* (2013.01); *G06F 21/6218* (2013.01); *H04L 41/28* (2013.01); *H04L 63/0884* (2013.01); *H04L 63/101* (2013.01); *H04L 63/104* (2013.01); *H04L 63/20* (2013.01)

(58) Field of Classification Search
CPC . G06F 21/10; G06F 3/06; G06F 21/60; G06F 21/62; H04L 63/08; H04L 63/10; H04L 63/20; H04L 63/102; H04L 63/101; H04L 63/105; H04L 41/28; H04L 67/22; H04L 63/0861; H04L 67/306; H04L 63/083; H04L 63/107; H04L 63/0815; H04L 63/0884; H04L 63/104; H04L 12/24
See application file for complete search history.

(56) References Cited

U.S. PATENT DOCUMENTS

| | | | | |
|---|---|---|---|---|
| 7,461,334 | B1* | 12/2008 | Lu ..................... | G06F 17/30887 707/E17.115 |
| 7,712,143 | B2* | 5/2010 | Comlekoglu ........... | G06F 21/53 713/181 |
| 8,010,458 | B2 | 8/2011 | Galbreath et al. | |
| 8,185,558 | B1 | 5/2012 | Narayanan et al. | |
| 8,214,883 | B2 | 7/2012 | Obasanjo et al. | |
| 8,676,844 | B2 | 3/2014 | Sityon et al. | |
| 8,880,620 | B2 | 11/2014 | de Souza | |
| 9,047,643 | B2 | 6/2015 | Menten | |
| 9,165,079 | B1 | 10/2015 | Kulick | |
| 9,177,168 | B2* | 11/2015 | Menten ............. | G06F 17/30625 |
| 9,348,947 | B2 | 5/2016 | Stetson et al. | |
| 9,740,837 | B2* | 8/2017 | Gora ........................ | G06F 21/12 |
| 9,742,744 | B1 | 8/2017 | Ho | |
| 2003/0237006 | A1* | 12/2003 | Himmel .............. | G06F 21/6218 713/168 |
| 2004/0111375 | A1* | 6/2004 | Johnson ................. | G06Q 20/06 705/64 |
| 2005/0050010 | A1* | 3/2005 | Linden .............. | G06F 17/30595 |
| 2005/0076030 | A1* | 4/2005 | Hada ................ | G06F 17/30938 |
| 2005/0144162 | A1* | 6/2005 | Liang ................ | G06F 17/30109 |
| 2006/0069668 | A1 | 3/2006 | Braddy et al. | |
| 2006/0206931 | A1 | 9/2006 | Dillaway et al. | |
| 2007/0156687 | A1* | 7/2007 | Idicula ................ | G06F 17/3023 |
| 2007/0240203 | A1* | 10/2007 | Beck ....................... | G06F 21/33 726/4 |
| 2008/0243517 | A1* | 10/2008 | Muschett ................ | G10L 15/22 704/275 |
| 2009/0172328 | A1* | 7/2009 | Sahita ................ | G06F 12/1491 711/163 |
| 2009/0300747 | A1* | 12/2009 | Ahn ........................ | G06F 21/34 726/9 |
| 2010/0058462 | A1* | 3/2010 | Chow ................ | A61N 1/37247 726/17 |
| 2011/0239283 | A1* | 9/2011 | Chern ..................... | G06F 21/33 726/6 |
| 2012/0054824 | A1 | 3/2012 | Furukawa | |
| 2012/0124478 | A1 | 5/2012 | King et al. | |
| 2012/0240242 | A1* | 9/2012 | Ferenczi ............... | G06F 21/604 726/28 |
| 2013/0080625 | A1* | 3/2013 | Morinaga ............. | G06F 21/552 709/224 |
| 2013/0283276 | A1 | 10/2013 | Vijayarajan et al. | |
| 2013/0290226 | A1 | 10/2013 | Dokken | |
| 2014/0095560 | A1* | 4/2014 | Ikai ................... | G06F 17/30221 707/829 |
| 2014/0123312 | A1* | 5/2014 | Marcotte ................. | G06F 21/33 726/28 |
| 2014/0215551 | A1* | 7/2014 | Allain ..................... | H04L 63/10 726/1 |
| 2014/0245373 | A1* | 8/2014 | Martin .................. | G06F 21/604 726/1 |
| 2014/0317676 | A1 | 10/2014 | Nair et al. | |
| 2015/0058191 | A1* | 2/2015 | Khan ..................... | G06Q 20/42 705/35 |
| 2015/0249655 | A1 | 9/2015 | Lunt | |
| 2015/0287120 | A1* | 10/2015 | Davidson ........... | G06Q 30/0631 705/26.7 |
| 2015/0304294 | A1 | 10/2015 | Roth | |
| 2016/0203327 | A1* | 7/2016 | Akkiraju ............. | G06F 16/9024 707/785 |
| 2018/0019875 | A1* | 1/2018 | Sahita ................... | H04L 9/3234 |
| 2018/0129436 | A1 | 5/2018 | Standefer, III et al. | |

OTHER PUBLICATIONS

"File URI scheme," (Apr. 6, 2012 version) accessible at https://web.archive.org/web/20120406064402/https://en.wikipedia.org/wiki/File_URI_scheme (hereinafter "Wikipedia").*
Terdon, https://askubuntu.com, "Can another user see a file even if they don't have any permissions?", May 5, 2015 (Year: 2015).*
Afshin, https://askubuntu.com, "How to list all symbolic links in a directory", Sep. 9, 2014 (Year: 2014).*
Bell et al., "File-System Interface", available at https://web.archive.org/web/20140701054936/https://www.cs.uic.edu/~jbell/CourseNotes/OperatingSystems/11_FileSystemInterface.html. (Year: 2014).*
"Access control lists the graph database way", https://neo4j.com/blog/access-control-lists-the-graph-database-way/, Feb. 25, 2010, 7 pages.
Alam et al., "Mauth: A fine-grained and user-centric permission delegation framework for web services", In International Journal of Physical Sceinces vol. 6, Issue 8, Apr. 18, 2011, 11 pages.
Carminati et al., "Rule-Based Access Control for Social Networks", In Proceedings of IFIP WG 2.12 and WG 12.4 International Workshop on Web Semantics, Oct. 29, 2006, 4 pages.
Ko et al., "Social Networks Connect Services", In Publication of IEEE Computer Society, Aug. 2010, 8 pages.
Ruan et al., "Implementing Authorization delegations Using Graph", In Proceedings of the 17th International Conference on Database and expert Systems Applications, Sep. 4, 2006, 3 pages.
"International Search Report and Written Opinion Issued in PCT Application No. PCT/US2017/059624", dated Dec. 20, 2017, 12 Pages.
U.S. Appl. No. 15/344,251, Office Action dated Jan. 30, 2018, 12 pages.
"International Search Report and Written opinion issued in PCT Application PCT/US17/059623", dated Jan. 18, 2018, 12 pages.
"Final Office Action Issued in U.S. Appl. No. 15/344,251", dated Oct. 30, 2018, 13 Pages.
"First Office Action and Search Report Issued in Chinese Patent Application No. 201780067109.9", dated Dec. 8, 2020, 13 Pages.

* cited by examiner

Query: http://.../collection300/task123?$expand=taskOn

Query: http://.../collection300/task123

Query: http://.../collection300/task123?$expand=taskOn($expand=attachmentOn)

Query: http://.../collection300/task123?$expand=taskOn($expand=attachmentOn($filter=Subject eq 'Sets'))

DELEGATED AUTHORIZATION FOR ISOLATED COLLECTIONS

BACKGROUND

The authentication of electronic information is a process in which a set of received credentials are evaluated to determine the authenticity of a user (e.g., the user is who the claim to be). Authorization, which occurs after a successful authentication, is a process in which access to the electronic information is determined for one or more users. Over the years, various authorization approaches have evolved. Typically, such approaches require the implementation and maintenance of complex architectures and services that must comprehensively facilitate processes, such as enrollment, token generation/assignment and life-cycle maintenance. As such requirements are often resource-intensive, alternate authorization approaches are desirable in many situations.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

Examples of the present disclosure describe systems and methods of delegating authorization to access isolated collections of data. In aspects, a request to access an isolated collection of resources, resource identifiers and/or relationships may be received by an application for determining, navigating and/or visualizing relationships between resources (e.g., people, files, tasks, etc.). The resource identifiers may correspond to resources in one or more remote data repositories. Upon receiving the request, the application may interrogate a remote data repository to determine whether the requestor is currently authorized to access the one or more resources corresponding to the resource identifiers in the isolated collection. If the requestor is determined to be authorized, the application may use an authorization indication provided by the remote data repository to provide the requestor with access to the isolated collection. If the requestor is determined to be unauthorized, the application may prohibit the requestor from accessing the isolated collection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
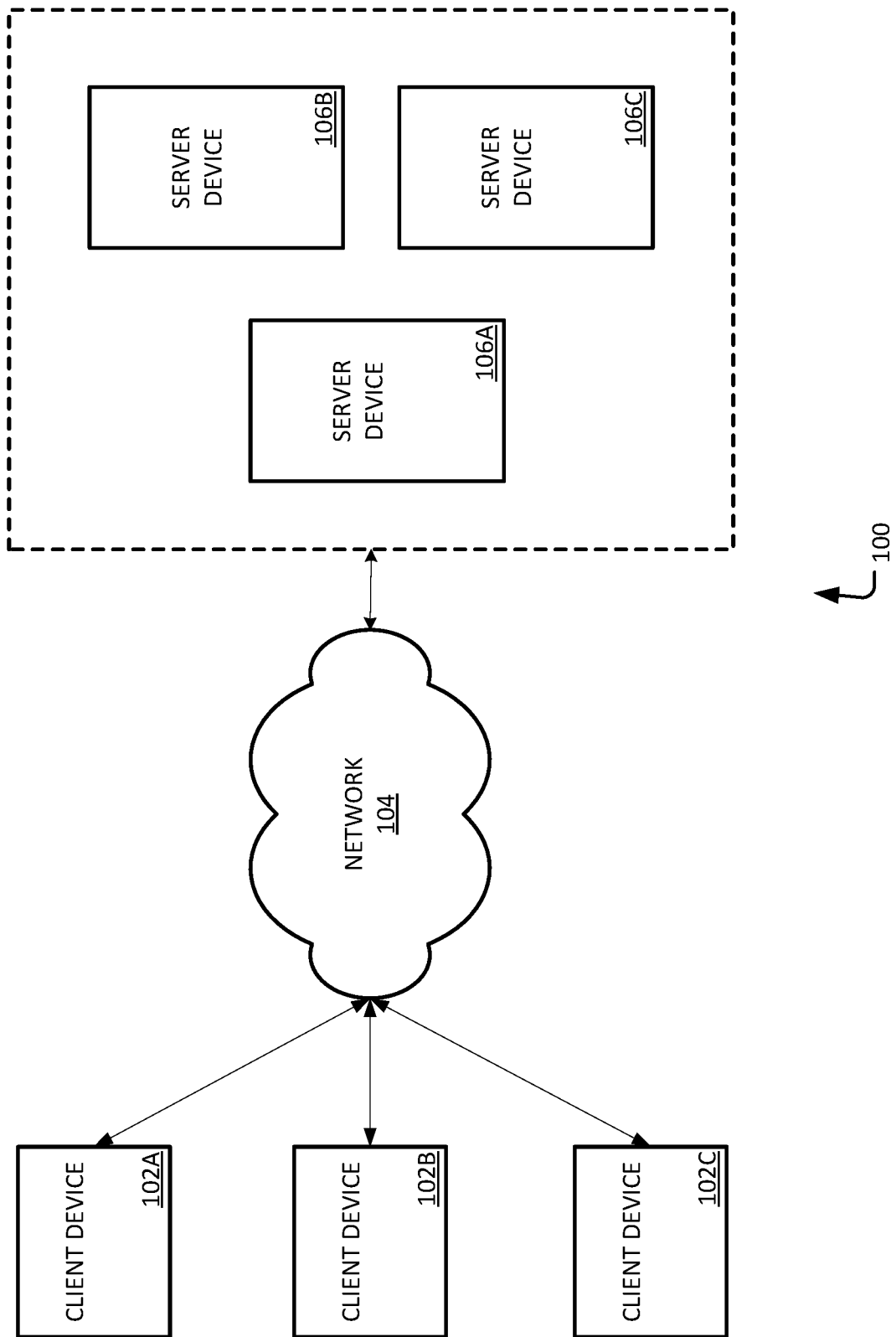
FIG. 1 illustrates an overview of an example system for authorizing access an isolated collection as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods of delegating authorization to access isolated collections of asserted data. In aspects, an application or service for managing isolated collections of asserted data may be accessible to a client. An isolated collection of asserted data, as used herein, may refer to one or more asserted resources and relationships between those resources. In examples, a resource may correspond to a person, an entity, a file, a task, an electronic communication, a document (or portion thereof), a calendar event, a task, etc. A resource may be associated with a resource identifier (e.g., uniform resource locator (URL), uniform resource name (URN), etc.). A resource identifier may identify a resource and enable interaction with representations of the resource over a network. A relationship may identity associations between one or more resources and/or resource identifiers. Such relationships may be identified and/or determined manually, using one or more rule sets, or using semantic web technologies (e.g., resource description framework (RDF), RDF schema (RDFS), SPARQL Protocol and RDF Query Language (SPARQL), Web Ontology Language (OWL), etc.). An isolated collection may comprise one or more resources, resource identifiers and/or relationships. An isolated collection may also comprise permission information, one or more rule sets and/or metadata (e.g., resource/relationship description properties, such as title, creator, subject, description, publisher, contributor, date, type format, identifier, source, language, relation, coverage, rights, etc.). A resource and/or a relationship (and corresponding data) may be referred to as "asserted" when the resource and/or relationship is not inferred or defined by the isolated collection. For example, a resource/relationship may be asserted if it is manually defined, determined by querying or interacting with a resource provider or data store, or the like. In contrast, a resource/relationship (and corresponding data) may be referred to as "inferred" when the isolated collection defines a resource/relationship (or property thereof) using one or more rules of the isolated collection. For example, a resource/relationship may be inferred if an isolated collection (or the application or service managing the isolated collection) executes one or more rules stored by (or specifically associated with) the isolated collection against asserted data stored by the isolated collection. An inferred resource or relationship may provide additional information or enriched information for asserted data (e.g., resources, resource identifiers, relationships, etc.). Inferred data may be stored in, or by, an isolated collection. An isolated collection comprising both asserted data and inferred data may be referred to as an enriched isolated collection of asserted data. As used herein, an isolated collection of asserted data and an enriched isolated collection of asserted data may be referred to as an "isolated collection" or a "Set."

In aspects, the data for an isolated collection (and metadata thereof) may be stored in one or more data stores accessible to the application/service. The metadata may comprise resource and/or relationship description properties, such as title, creator, subject, description, publisher, contributor, date, type format, identifier, source, language, relation, coverage, rights, etc. The application/service may provide access to an interface for querying, navigating, visualizing and/or modifying an isolated collection, associated metadata or corresponding underlying resources. In examples, the application/service may receive a request from a requestor to access or generate an isolated collection and/or data associated with the isolated collection. The application/service may search the data store(s) to determine at least a portion of the resource identifiers comprised in the requested isolated collection. The application/service may use the determined resource identifiers to identify and/or locate one or more corresponding resources. Identifying/locating a resource may include, for example, performing a HTTP call to a resource identifier, providing the resource identifier to a search/lookup utility, querying a resource provider, etc. In some aspects, when a determined resource identifier is located, a resource provider that is operable to access the resource corresponding to the determined resource identifier may be interrogated by the application/service. An interrogation, as used herein, may refer to a request to determine authorization information for one or more resources and/or resource providers. In examples, an interrogation may comprise accessing authorization files, user access event files, an authorization token repository, and/or a set of resource permissions on a resource provider. An interrogation may additionally or alternately comprise a request from the application/service to respond to one or more questions pertaining to, for example, whether the requestor is authorized to access the resource or the resource provider, whether the requestor's access to the resource has been authorized by the resource provider or an authentication provider, whether an indication of the authorization/authentication (e.g., a token, credentials, set of permissions, etc.) is currently accessible to the resource provider, whether the resource provider has access to the resource, an expiration date/time for an indication of an authorization/authentication, etc.

In aspects, the application/service may use the results of an interrogation to determine whether to provide access to an isolated collection and/or one or more resources associated with the isolated collection. For example, if the application/service determines from the interrogation that a requestor possesses a valid authorization indication to access a resource, the application/service may provide access to one or more isolated collections comprising a resource identifier corresponding to the resource. If, on the other hand, the application/service determines from the interrogation that a requestor does not possess a valid authorization indication to access a resource, the application/service may prevent (or at least fail to provide) access to one or more isolated collections comprising a resource identifier corresponding to the resource.

Accordingly, the present disclosure provides a plurality of technical benefits including but not limited to: enabling users to define and identify relationships between resources; inferring rich relationship from a small data set; creating a robust query model; enabling the execution of powerful queries on isolated collections; providing a user interface to create, manage and visualize isolated collections and permissions data; providing a delegated authorization model for isolated collection access; providing a conditional authorization model for isolated collection access; securing access to remote resources underlying isolated collections, among other examples.

FIG. 1 illustrates an overview of an example system for authorizing access an isolated collection as described herein. Example system 100 may be a combination of interdependent components that interact to form an integrated whole for performing delegated authorization. In aspects, system 100 may include hardware components (e.g., used to execute/run operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various datasets and graphical representations. In examples, the various datasets may comprise (or be otherwise associated with), for example, resource identifiers, resource metadata, relationship information, asserted relationships, graphical mapping information, query data, rule sets, such as, for example, inference rules, authorization information, authentication information, etc., as discussed in further detail below. Generally, the datasets are stored on one or more of server devices 106A-C and are accessible by the client devices 102A-C via a network connection, such as distributed network 104. In some examples, however, the datasets may be at least partially stored on one or more of the client devices 102A-C. The underlying resources represented in the various datasets may be stored locally or in a data store, such as a cloud storage application, accessible to client devices 102A-C. In at least one example, the underlying resources represented in the various datasets (or portions thereof) may be distributed across client devices 102A-C. For instance, client device 102A (e.g., a mobile phone) may locally store a first portion of the resources represented in the dataset, client device 102B (e.g., a tablet) may locally store a second portion of the resources, and client device 102C (e.g., a laptop) may locally store the remaining portion of the resources represented in the dataset. In examples, the client devices 102A-C may have access to all of the resources included in the data set, may have access to a subset of the resources included in the dataset, or, alternatively, may not have access to any of the resources included in the dataset.

Client devices 102A-C may be further configured to determine the location of one or more resources. In aspects, client devices 102A-C may interrogate resource providers and/or data stores comprising the resources corresponding to the resource identifiers in the various data sets. The interrogation may include identifying a remote device on which a resource is located (or from which a resource may be accessed). In some aspects, the interrogation may additionally include determining whether the remote device (or a service/separate remote device) has authorized access to the resource. If it is determined that access to the resource has been authorized, client devices 102A-C may retrieve an authentication (or authorization) indication from the remote device or an authentication provider. Client devices 102A-C may then use the authentication/authorization indication to provide access to one or more of the various datasets comprising the corresponding resource identifier. As used herein, such authorization techniques may be referred to as delegated authorization. In other aspects, the interrogation may additionally include determining whether a set of conditions associated with a dataset has been fulfilled. In examples, one or more of the conditions in a set of conditions may be internal to the dataset, external to the dataset, or some combination thereof. If it is determined that a set of conditions has been fulfilled, client devices 102A-C may provide access to one or more corresponding datasets. As used herein, such authorization techniques may be referred to as conditional authorization.

Server devices 106A-C may be configured to store and/or provide access to one or more resources. For example, server device 102A may be a web server, server device 102B may be a device comprising a collaborative messaging tool and a calendaring application, and server device 102C may be electronic mail server. Each of these devices may comprise a repository of resources that is accessible via one or more authorization mechanisms. In examples, server devices 106A-C may perform or monitor the authorization process when a request for a resource is received. If the authorization is successful, the authorizing device may store or maintain an authentication/authorization indication for a specified period of time. When the period of time expires, server devices 106A-C may remove or attempt to renew the authentication/authorization indication. In examples, server devices 106A-C may provide the authentication/authorization indication to an interrogating client device. In some aspects, server devices 106A-C may further be configured to store at least a portion of the various data sets and graphical representations, as discussed above.

Figure 2:
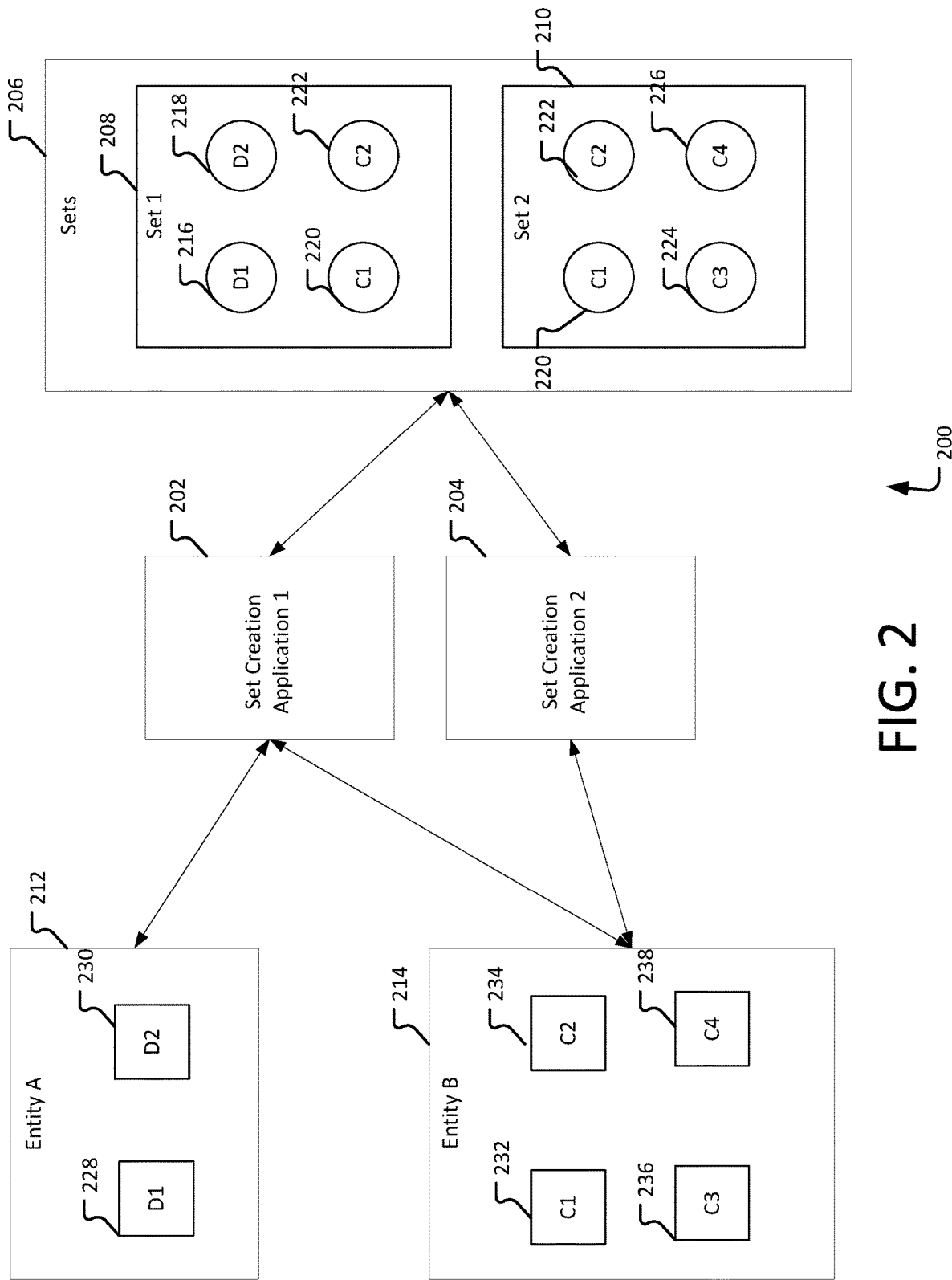
FIG. 2 illustrates an overview of an example system for managing isolated collections of resource identifiers and corresponding relationships as described herein.

FIG. 2 illustrates an overview of an example system 200 for managing isolated collections of resource identifiers and corresponding relationships. The isolated collection techniques implemented in system 200 may comprise or be associated with one or more of the delegated authorization techniques described in FIG. 1. In alternative examples, a single device (comprising one or more components such as processor and/or memory) may perform the processing described in systems 100 and 200, respectively.

With respect to FIG. 2, system 200 may comprise Set creation applications 202 and 204, Set environment 206, Sets 208 and 210, entities 212 and 214, resources identifiers 216, 218, 220, 222, 224 and 226, and resources 228, 230, 232, 234, 236 and 238. In aspects, Set creation applications 202 and 204 may be an application or service configured to create, infer, manipulate, navigate and visualize various resources, relationships and graphical representations. Set creation applications 202 and 204 may define isolated collections of relationships between resources (e.g., people, files, tasks, mail, documents, calendar events, etc.) and executing queries on those isolated collections. Set creation applications 202 and 204 may further provide for defining and storing rulesets used to infer one or more relationships in the isolated collections, and displaying graphical representations of the isolated collection data. The defined rulesets may be stored in the isolated collection itself, and in some examples is stored as metadata within the isolated collection. In examples, Set creation applications 202 and 204 may be installed and executed on a client device or on one or more devices in a distributed environment. For instance, Set creation application 202 may be installed on client device 102A, Set creation application 204 may be installed on client device 102B, and a Set creation service associated with server device 106A may be accessible to client device 102C.

In aspects, Set creation applications 202 and 204 may have access to a file directory or an execution environment, such as environment 206. Environment 206 may be co-located with a Set creation application, or environment 206 may be located remotely from the Set creation application. Environment 206 may provide access to one or more isolated data collections, such as Sets 208 and 210. In examples, access to the isolated data collections may be determined using one or more permissions sets generated and/or maintained by Set creation applications 202 and 204. The permissions sets may be different across one or more of the isolated data collections. As a result, one or more of the isolated data collections (or functionality associated therewith) may not be accessible from one or more of Set creation applications 202 and 204.

Sets 208 and 210 may respectively comprise isolated collections of asserted and/or inferred resource identifiers and relationships. The relationships in the isolated collections may be defined manually or may be automatically derived using one or more rule sets. The isolated collections may be represented using graphical structures, such as a named graph, that directly relate resources in the data collection and provide for retrieving relationship data with a single operation. Each isolated collection may comprise resource identifiers that are unique to that isolated collection. Alternately, the isolated collections may comprise resource identifiers included in one or more alternate isolated collections. For example, as depicted in FIG. 2, Set 208 may comprise resource identifiers 216, 218, 220 and 222, and Set 210 may comprise resource identifiers 220, 222, 224 and 226. Resource identifiers 216, 218, 220, 222, 224 and 226 may correspond to, and/or identify the location of, one or more resources. As used herein, a resource identifier references an existing resource but is not itself a resource. Exemplary types of resource identifiers include, but are not limited to, a Uniform Resource Identifier (e.g., a Uniform Resource Locator (URL), a Uniform Resource Name (URN) etc.), an IP address, a memory or storage address, and the like. One of skill in the art will appreciate that any type of identifier may be employed by the various aspects disclosed herein without departing from the scope of this disclosure. Identifying the location of a resource may include parsing the resource identifier using, for example, regular expressions, providing one or more portions of the resource identifier to a search utility, executing the resource identifier, etc. In aspects, having access to the data collections does not guarantee access to the resources identified by the resource identifiers included in each data collection. For example, although a user may be able to access and manipulate Set 208, the user may not be authorized to access one or more of the underlying resources corresponding to the resource identifier in Set 208.

Resource providers 212 and 214 may be configured to store and/or provide access to one or more resources. As such, a resource provider as used herein may be a data store, a cloud service provider, a client computing device, a server computing device, a distributed system of devices, such as, for example, an enterprise network, an application, a software platform (e.g., an operating system, a database, etc.), and the like. In aspects, resource providers 212 and 214 may be (or have access to) various different data sources, such as content providers, data stores, various sets of application data, and the like. The data stores may comprise one or more resources corresponding to one or more resource identifiers. For example, as depicted in FIG. 2, resource provider 212 may be a data store comprising various different types of resources such as resource 228 (e.g., document 1 (D1)) and resource 230 (e.g., presentation2 (P1)) and resource provider 214 may be a contact management application comprising contact resources 232 (e.g., contact 1 (C1)), 234 (e.g., contact 2 (C2)), 236 (e.g., contact 3 (C3)) and 238 (e.g., contact 4 (C4)). In this example, resource identifier 216 may correspond to resource 228; resource identifier 218 may correspond to resource 230; resource identifier 220 may correspond to resource 232; resource identifier 222 may correspond to resource 234; resource identifier 224 may correspond to resource 236; and resource identifier 226 may correspond to resource 238.

In some aspects, resource providers 212 and 214 (or resources associated therewith) may be accessible by Set creation applications 202 and 204. For example, Set creation applications 202 and 204 may access resource providers 212 and 214 to determine the existence of resources and/or retrieve information associated with the resources (e.g., resource metadata, resource location, resource identifiers, permission sets, authorization data, etc.). In an alternate example, Set creation applications 202 and 204 may not have access to resource providers 212 and 214. Instead, resource providers 212 and 214 may, for example, publish or broadcast resources and/or resource information to one or more devices or storage locations. Set creation applications 202 and 204 may then access the devices or storage locations receiving the resources/resource information to determine the existence of resources. In yet another example, Set creation applications 202 and 204 may receive resources/ resource information directly. For instance, a user may use an interface accessible to Set creation applications 202 and 204 to create or upload one or more resources. In such aspects, the retrieved resources/resource information may be used to determine a set of resource identifiers corresponding to one or more of the available resources. The set of resource identifiers may be used to create one or more isolated collections. As noted above, the resource identifiers may be, or include, a durable URI for its corresponding resource. For instance, the resource identifier 216 may include the URI for the actual document (D1) 228. Accordingly, in such an example, a user is able to determine the location of the document (D1) 228 from the Set, and, depending on authorization and access restrictions, retrieve the document (D1) 228. As another example, as depicted in FIG. 2, resource provider 212 may be accessed by Set creation application 202. Set creation application 202 may determine that resource provider 212 comprises at least resources 228 and 230, and may determine resource identification information for each of the resources. Based on the determined resource identification information, resource identifiers 216 and 218 may be respectively applied/correlated to resources 228 and 230, and provided to environment 206. Environment 206 may then make resource identifiers 216 and 218 eligible for an inclusion analysis into one or more isolated collections.

Figure 3A:
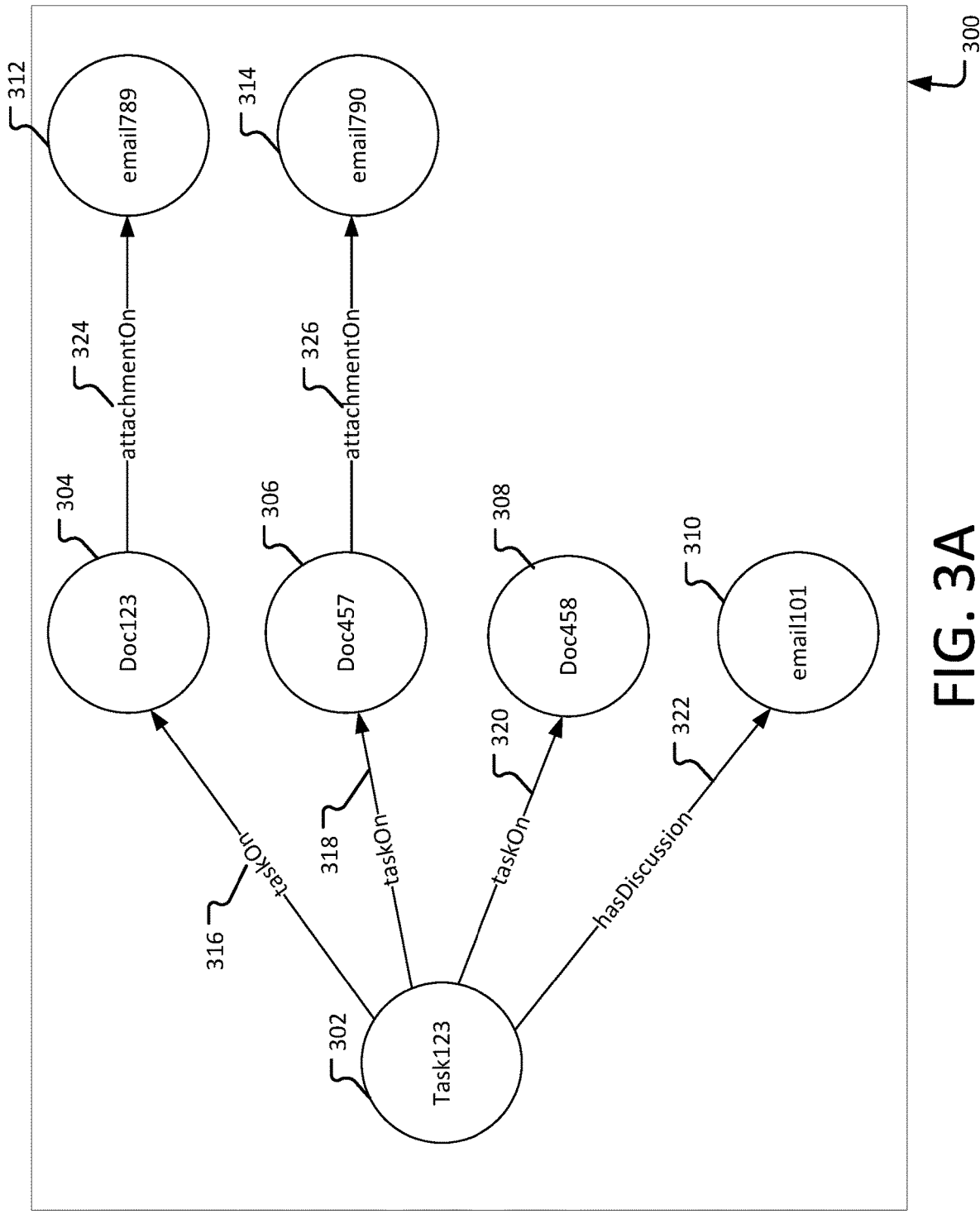
FIGS. 3A-E illustrate an example isolated collection as described herein.

FIG. 3A illustrates an example isolated collection 300 of resource identifiers and corresponding relationships. Example isolated collection 300 comprises resource identifiers 302, 304, 306, 308, 310, 312 and 314, and relationships 316, 318, 320, 322, 324 and 326. In aspects, isolated collection 300 may be generated and/or manipulated using a collection creation utility that may be included as part of a Set creation application as discussed above. When presented in graph form as depicted in the FIG. 3A, each resource identifier may be referred to as a "node" and each relationship may be referred to as an "edge." The collection creation utility may also identify resources and/or determine resource types for collections using one or more rulesets that may include rules defined in accordance with semantic web technologies, such as resource description framework (RDF), RDF schema (RDFS), SPARQL Protocol and RDF Query Language (SPARQL), Web Ontology Language (OWL), etc. For example, isolated collection 300 includes a resource identifier 312 that represents an underlying resource, "email789" in the depicted example. Similarly, resource identifier 304 represents a resource document, "Doc123," and resource identifier 302 represents a resource task, "Task123." Each of the resources and relationships included in the isolated collection 300 may have been asserted by a developer through a Sets creation application.

For instance, a developer may manually add each of the resource identifiers and the relationships between the resource identifiers. As an example, the developer may manually indicate that the "task123" is a task on "Doc123," as represented in the isolated collection 300 by the "taskOn" relationship 316. The resource identifiers and relationships may also be asserted by an external bot or application created by a developer. For instance, an add-in may be programmed to monitor activity in a browser or other application to track usage of the application. Based on the usage of the application, the add-in may send additional resources and relationships to be included in the isolated collection 300.

In contrast to the asserted resource identifiers and relationship, a collection creation utility may execute a ruleset to determine additional relationships and resource types, referred to herein as "inferred relationships" and "inferred resource identifiers" or "inferred resource types." For example, upon execution of a ruleset, the collection creation utility may determine that resource identifier 312 represents an email message, and resource identifier 304 represents a document. Generation of inferred relationships and resources is discussed in further detail below. Based on this determination, the collection creation utility may assign relationship 324 (e.g., "attachmentOn") to define the association between resource identifier 312 and resource identifier 304. The collection creation utility may utilize a similar approach to assign relationship 326 (e.g., "attachmentOn") to define the association between resource identifier 314 and resource identifier 306.

Isolated collection 300 further depicts that resource identifier 302 is associated with resources identifiers 304, 306 and 308 and resource identifier 310. The collection creation utility may determine that the resource identifier 302 represents a task to be performed on identifiers 304, 306 and 308. Based on this determination, the collection creation utility may assign relationships 316, 318 and 320 (e.g., "taskOn") to define the association between resource identifier 302 and resource identifier 304, 306 and 308. The collection creation utility may further determine that resource identifier 310 represents an email (without an attachment) that comprises a discussion of one or more aspects of resource identifier 302. Based on this determination, the collection creation utility may assign relationship 322 (e.g., "hasDiscussion") to define the association between resource identifier 302 and resource identifier 310.

Figure 3C:
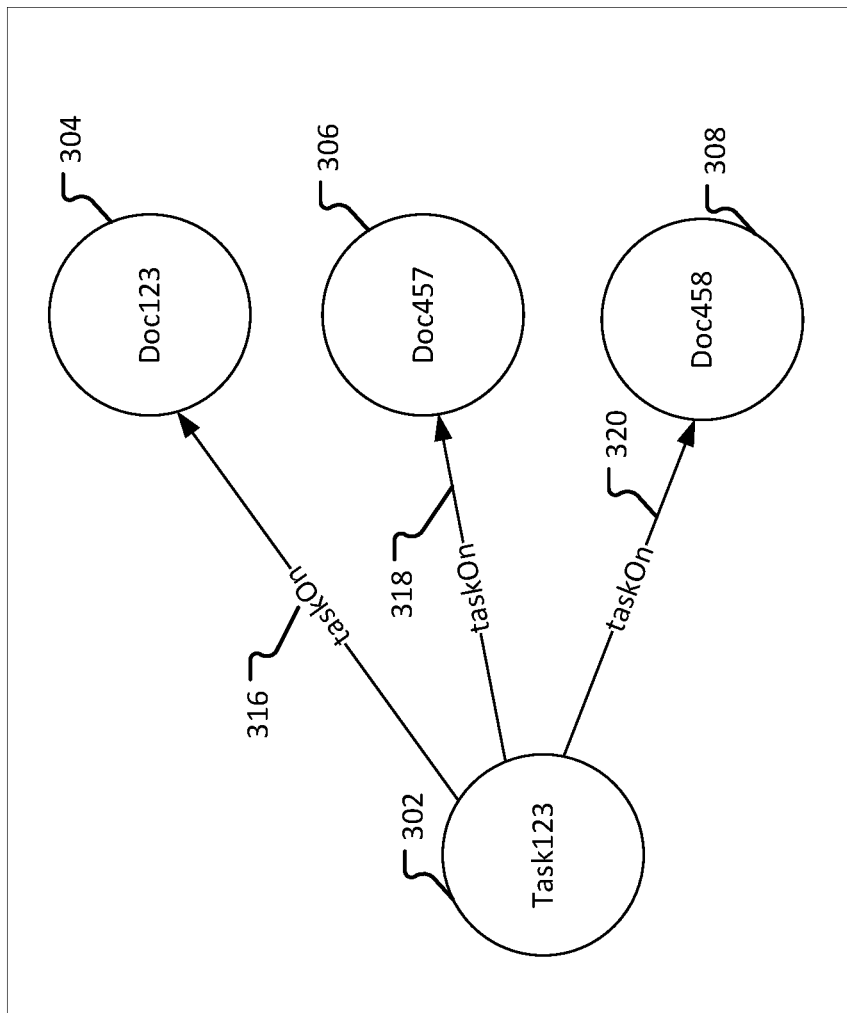
Figure 3B:
Figure 3D:
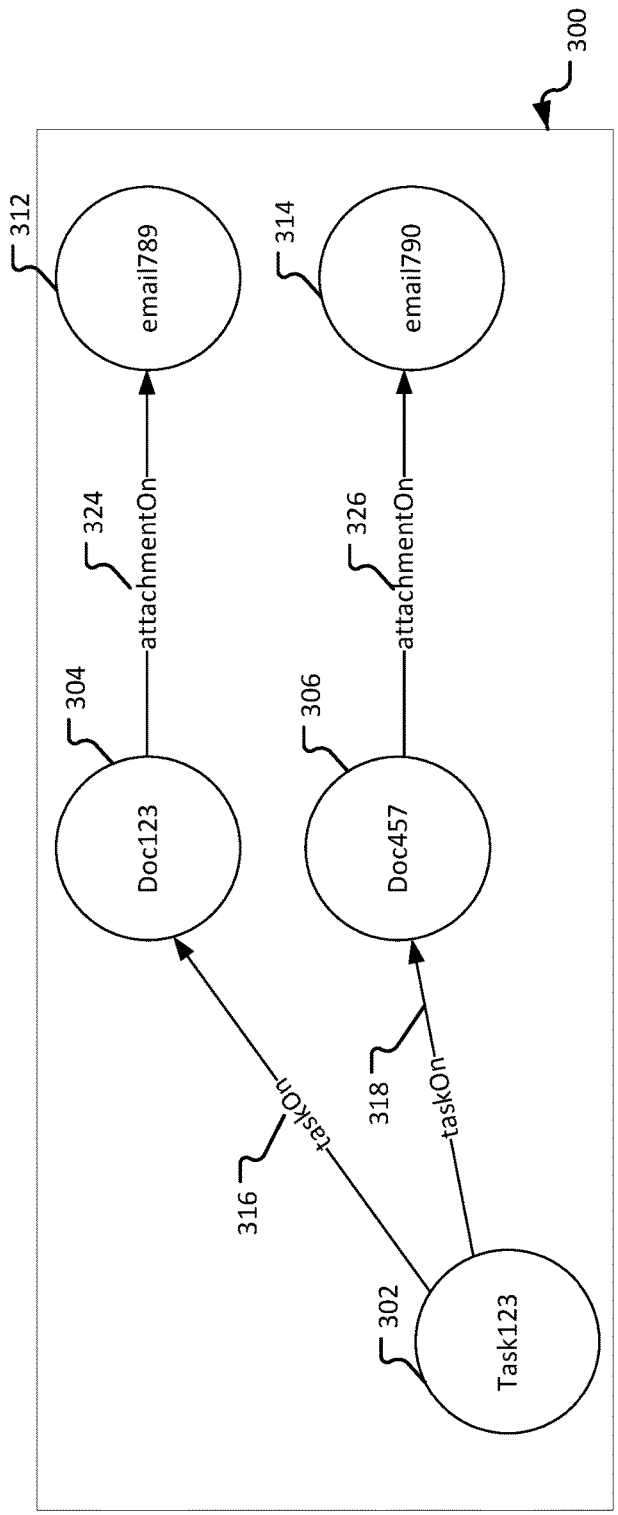
Figure 3E:
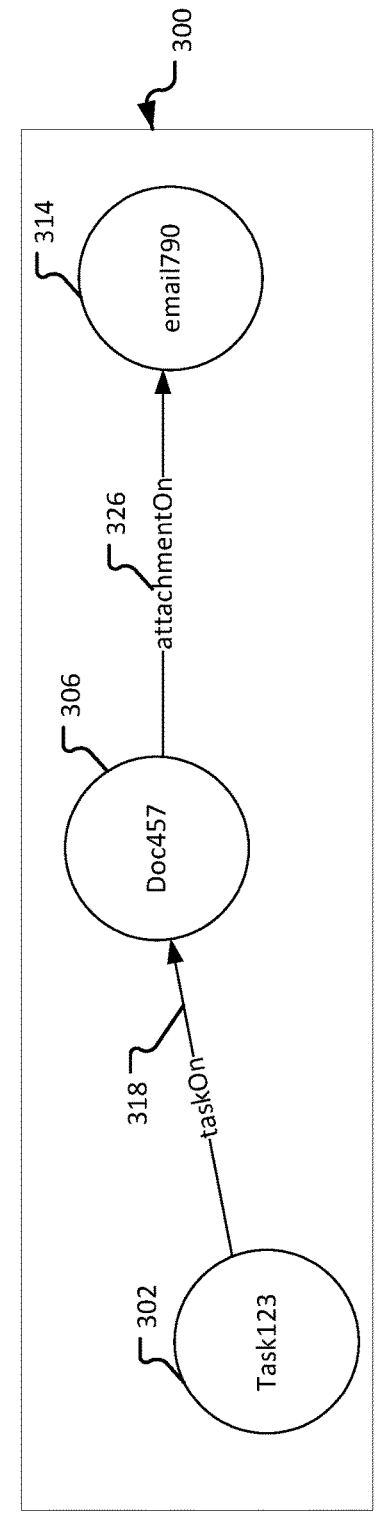

FIGS. 3B-3E illustrate an example query model that may be used to traverse isolated collection 300. In aspects, queries may be executed via an interface provided by the collection creation utility. A query may be executed against one or more files and/or directories comprising information, such as resource identifiers, resource type, resource metadata, permission data, etc. The query results may be visualized in a graph form as one or more collections, such as isolated collection 300. For example, the entire isolated collection 300 dataset may comprise only those elements illustrated in collection 300 (e.g., resource identifiers 302, 304, 306, 308, 310, 312 and 314 and relationships 316, 318, 320, 322, 324 and 326). In this particular example, resource identifier 312 may represent an email comprising the subject "API Design" and resource identifier 314 may represent an email comprising the subject "Sets." The query 'http:// . . . /collection300/task123' may be executed against isolated collection 300. The query results may comprise resource identifier 302 and be visualized as illustrated. In FIG. 3C, the query has been amended to 'http:// . . . /collection300/task123?$expand=taskOn' and executed against isolated collection 300. The query results may comprise resource identifiers 302, 304, 306 and 308 and relationships 316, 318 and 320, and be visualized as illustrated. In FIG. 3D, the query has been amended to 'http:// . . . /collection300/task123?$expand=taskOn ($expand=attachmentOn)' and executed against isolated collection 300. The query results may comprise resource identifiers 302, 304, 306, 308, 312 and 314 and relationships 316, 318, 320, 324 and 326, and be visualized as illustrated. In FIG. 3E, the query has been amended to 'http:// . . . /collection300/task123?($expand=taskOn ($expand=attachmentOn($filter=Subject eq 'Sets'))' and executed against isolated collection 300. As only resource identifier comprises the subject "Sets", the query results may comprise resource identifiers 302, 306 and 314 and relationships 318 and 326, and be visualized as illustrated.

Figure 4:
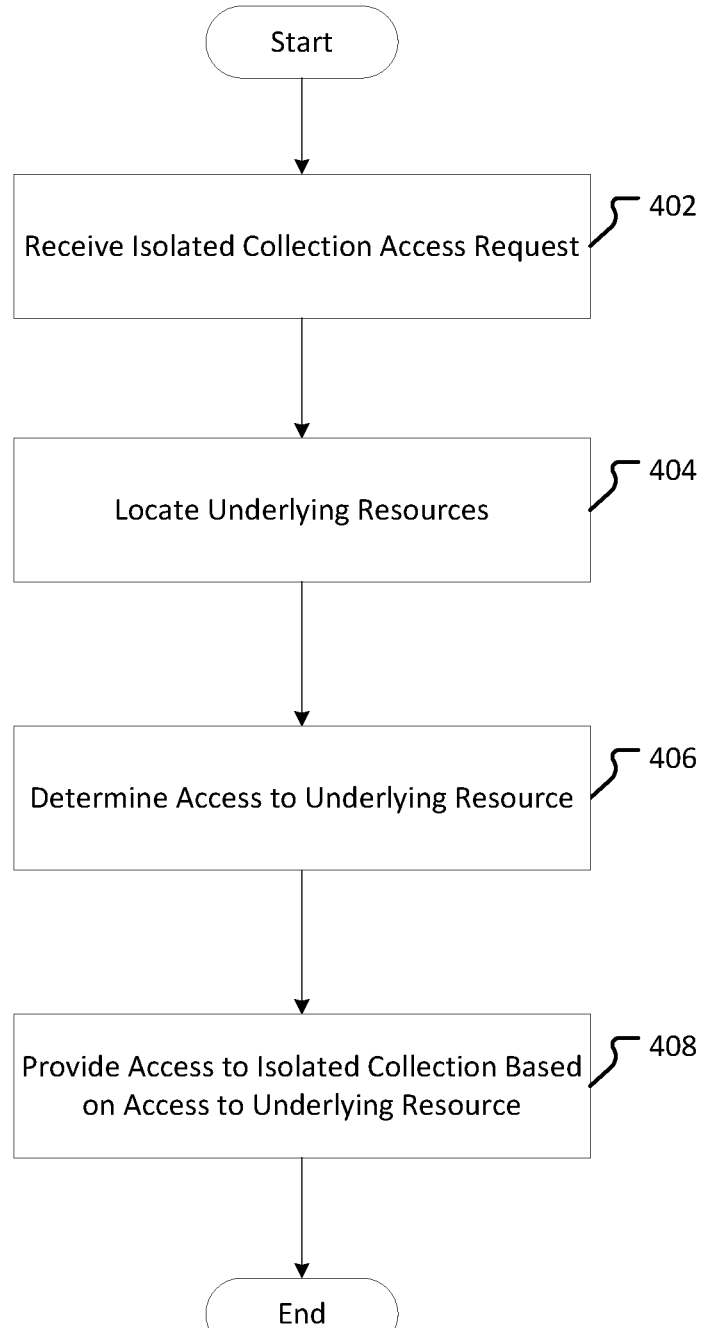
FIG. 4 illustrates an example method of delegating authorization to access isolated collections of data as described herein.

FIG. 4 illustrates an example method 400 of delegating authorization to access an isolated collection. In aspects, method 400 may be executed by an exemplary system such as system 100 of FIG. 1. In examples, method 400 may be executed on a device comprising at least one processor configured to store and execute operations, programs or instructions. However, method 400 is not limited to such examples. In other examples, method 400 may be performed on an application or service for providing delegated authorization. In at least one example, method 400 may be executed (e.g., computer-implemented operations) by one or more components of a distributed network, such as a web service/distributed network service (e.g. cloud service).

Exemplary method 400 begins at operation 402 where a request to access one or more isolated collections, such as Sets 208 and 210, may be received by a collection creation application/service, such as Set creation applications 202 and 204, for developing and exploring isolated collections. In aspects, a collection creation application/service may be installed on, or accessible by, a computing device, such as client devices 102A-C. The collection creation application/service may have access to one or more files or directories comprising information, such as resource identifiers, resource types, resource metadata, relationship information, one or more rule sets, one or more statistical or predictive models, permission data, authorization information, query data, one or more query models, graphical components, resource mapping data, etc. The collection creation application/service may be accessible via an interface, such as a graphical user interface, a command line interface, an API, etc. In examples, a request to generate and/or access one or more isolated collections and/or associated information may be received by the collection creation application/service via the interface. The request may be in the form a query, as described above with respect to FIGS. 3B-E. In another example, the request may be in the form of a selection of a menu, a menu item, an object, a property/attribute, a portion of a graph or graphical object, etc. The request may comprise request data, such as client data (e.g., user name, password, device name, IP address, an authentication and/or authorization indication, etc.), isolation collection data, file system locations, etc. An isolated collection may comprise resource identifiers, relationship information and/or metadata from one or more portions of the files or directories described above. An isolated collection may be subject to the various security permission or boundaries. In examples, each isolated collection may contain its own set of security permissions. The security permissions may provide for varying degrees of access to the isolated collection. For instance, a first permission category may provide for full control of an isolated collection and the corresponding metadata, a second permission category may provide for read/write access to the content of the isolated collection, but no access to the corresponding metadata, and a third permission category may provide only for read access to the content of the isolated collection, but no access to the corresponding metadata. The security permissions may be checked upon access to the isolated collection as well as upon access to the file or directories implicated by the isolated collection. The security permissions may be stored as part of the metadata of an isolated collection. In aspects, access to the isolated collection does not necessarily imply access from the isolated collection to the underlying resources represented by the resource identifiers in the isolated collection. That is, a user or group having access to a resource identifier in an isolated collection may not be able to access the underlying resource from the isolated collection. In such aspects, the security permissions of an isolated collection may be separate and distinct from the security permissions of underlying resources associated with the isolated collection.

At operation 404, one or more underlying resource may be located. In aspects, the collection creation application/service may search and/or evaluate an isolated collection (or a corresponding file/directory) to identify one or more resource identifiers. The search may include one or more pattern matching techniques, an attribute or property analysis, or the like. The search may generate a list of resource identifiers. The list of resource identifiers may be used to determine a physical or logical location of underlying resources corresponding to the resources in the list of resources. In examples, the location of the underlying resource may be determined by using one or more communication protocols (e.g., HTTP, FTP, etc.) to call to a resource identifier, providing the resource identifier to a search/lookup utility, querying a resource provider for a list of stored/accessible resources, querying a network appliance for a list of transmitted/stored resource and locations, etc. For example, a collection creation application/service may cause an HTTP call to an identified resource identifier to be made to a search engine. The search engine may respond by providing the underlying resource, a location to the underlying resource, access to a resource provider, an authorization challenge, or the like.

At operation 406, access to an underlying resource may be determined. In aspects, the collection creation application/service may use one or more portions of the request data to determine whether a requestor is associated with an identified resource provider or data store, such as resource providers 212 and 214. For example, the collection creation application/service may use account information (e.g., a user name and/or user credential) provided in the request data to determine whether a resource provider or data store is associated with a user account that is associated with a requestor (e.g., a user requesting access to an isolated collection). The determination may include providing the account information to a single sign on (SSO) access control system/utility, providing the account information to an authorization provider, comparing the account information from the collection creation application/service to account information from a resource provider, applying a credential in the request data to the resource provider, etc. In some aspects, if a requestor is determined to be associated with a resource provider, the collection creation application/service may generate an authorization and/or authentication indication. In other aspects, if a requestor is determined to be associated with a resource provider, the collection creation application/service may determine whether the requestor is authorized, or has been authenticated, to access the underlying resource from/on the resource provider. This determination may include identifying one or more authentication and/or authorization indications (e.g., a token, credentials, a permission set, etc.), analyzing one or more authorization event/access events, etc. In a particular example, the collection creation application/service may retrieve an identified authentication/authorization indication (or an approximate copy thereof) from the resource provider.

At operation 408, access to an isolated collection may be provided. In aspects, the collection creation application/service may provide access to an isolated collection based, at least in part, to one or more determinations of operation 406. For example, the determinations may include an analysis of several factors, such as, whether a requestor is determined to be authorized to access a resource provider having access to an underlying resource, whether an authentication/authorization indication to access an underlying resource has been identified, the expiration date/time of the authentication/authorization indication, the most recent access date/time of a resource or resource provider by a requestor, the most recent access date/time of a resource provider by a requestor, etc. In examples, a collection creation application/service may provide or prevent access to an isolated collection based on a single determination or based on a plurality of determinations. Generally, if a collection creation application/service determines to provide access to an isolated collection, the requestor is only provided access to the requested isolated collection. In some aspects, however, if a collection creation application/service determines to provide access to an isolated collection, the requestor may also be provided access to one or more additional isolated collections comprising the resource identifier of the underlying resource for which access was determined.

In at least one aspect, a collection creation application/service may perform access conflict resolution. For example, an isolated collection may comprise at least a first resource identifier and a second resource identifier. The collection creation application/service may determine that the requestor is authorized to access the underlying resource corresponding to the first resource identifier, but is not authorized to access the underlying resource corresponding to the second resource identifier. As a result, the collection creation application/service may apply a set of access resolution rules. The access resolution rules may provide, for example, an approach in which a requestor is provided access to an entire isolated collection if the requestor is determined to have access to at least one of the underlying resources corresponding to a resource identifier in an isolated collection. As another example, the access resolution rules may provide an approach in which a requestor is prevented access to an isolated collection if the requestor is determined to not have access to all of the underlying resources corresponding to the resource identifiers in an isolated collection. As yet another example, the access resolution rules may provide a hybrid approach in which a requestor is limited to accessing only those portions of an isolated collection that correspond to underlying resources to which the requestor has access.

Figure 5:
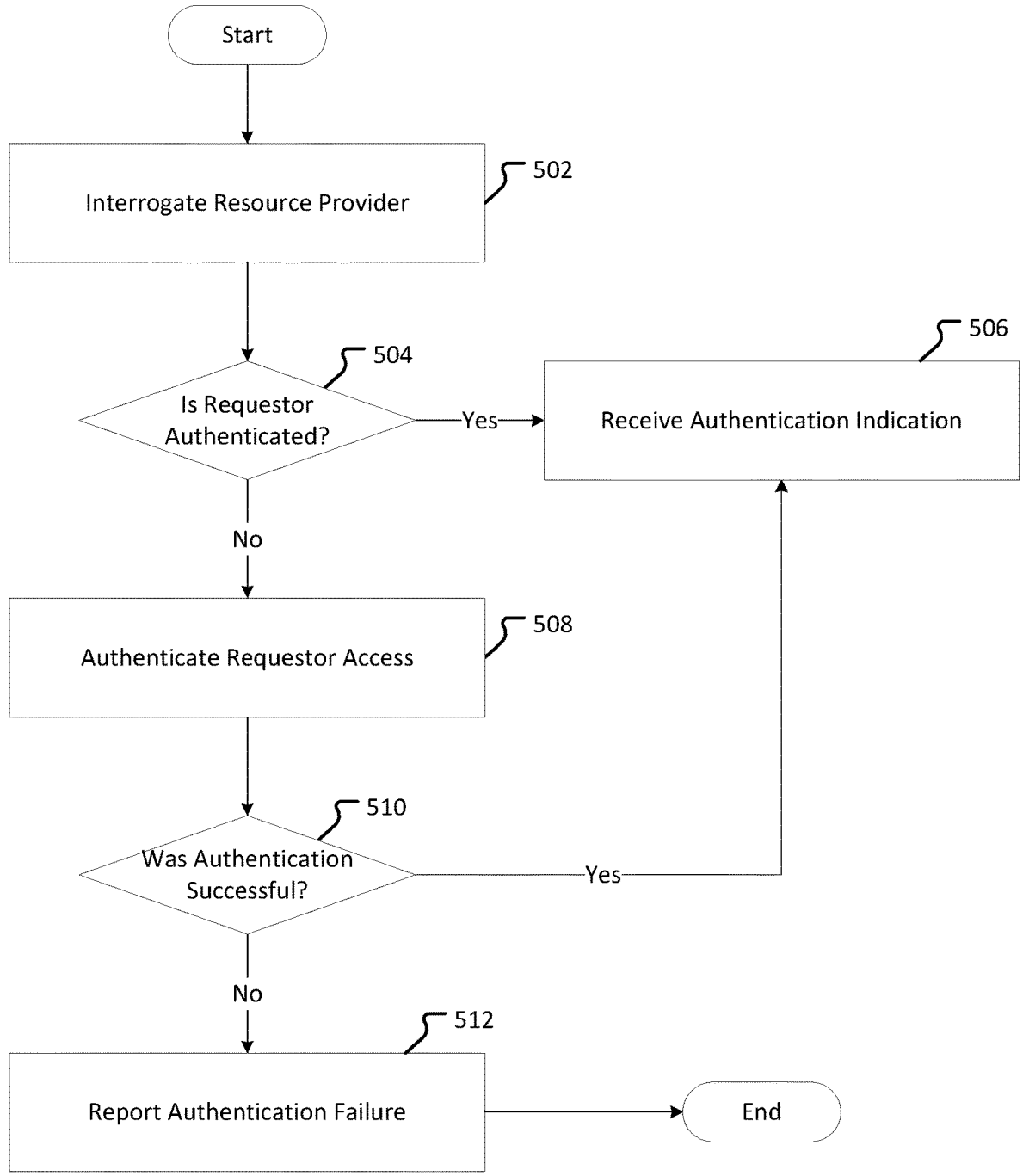
FIG. 5 illustrates an example method of determining access to an underlying resource of an isolated collection of data as described herein.

FIG. 5 illustrates an example method 500 of determining access to an underlying resource of an isolated collection. Exemplary method 500 begins at operation 502 where a resource providers may be interrogated. In aspects, a collection creation application/service, such as Set creation applications 202 and 204, may interrogate a resource provider, such as resource providers 212 and 214. The interrogation may be intended to determine the access of a requestor (e.g., a user requesting access to an isolated collection) to a resource provider and/or underlying resource. The interrogation may comprise accessing authorization data and/or user access event data for a resource provider, an authentication token repository, and/or a set of resource permissions for a resource provider. For example, the collection creation application/service may analyze a set of permissions for the requestor's account on the resource provider. The analysis may include determining whether the requestor is authorized, or has been authenticated, to access the resource provider. As another example, the collection creation application/service may request a security token from the resource provider authorizing access to an underlying resource. A security token, as used herein, may refer to a digital object used to store cryptographic data and prove a user's identity electronically. The security token may be stored by the resource provider of by a security token-issuing authority. As yet another example, the collection creation application/service may search an authorization file for the resource provider to determine where and when users log in and/or authenticate, user names, access times, device information, authentication providers, etc.

At decision operator 504, an authorization of the requestor may be performed or otherwise determined. In aspects, a collection creation application/service may use, at least, the interrogation information of operation 502 to determine whether a requestor is authorized to access a resource provider and/or an underlying resource. For example, the collection creation application/service may use a security token identified by interrogating a resource provider to determine that a requestor's access to one or more underlying resources accessible by the resource provider is authorized. If the collection creation application/service determines that access is authorized for a requestor, flow may proceed to operation 506. At operation 506, a collection creation application/service may receive or generate an indication of the determined authorization. For example, a collection creation application/service may retrieve a security token (or a copy of a security token) from a resource provider, a security token repository or a token-issuing authority. As another example, the collection creation application/service may copy/store a requestor's resource provider permissions (or an indication thereof) to the metadata of an isolated collection comprising data corresponding to an underlying resource. If the collection creation application/service determines that access is not authorized for a requestor, flow may proceed to operation 508.

At operation 508, a requestor's access may be authorized. In aspects, the collection creation application/service may attempt to authenticate a requestor or a requestor's access to an underlying resource if the collection creation application/service determines the requestor (or the requestor's access) is not currently authorized. For example, the collection creation application/service may request the resource provider to generate (or renew) an authorization for a requestor. The request may comprise client data (e.g., user name, password, device name, IP address, an authentication/authorization indication, etc.), resource identifiers, an expiration date/time, an expired credential/authorization, etc. The resource provider receiving the authorization request may cause an authorization event to initiate. In some examples, the authorization event may include an enrollment process, in which the requestor credentials are provided to a credential service provider. The credential service provider may execute a verification process to verify the identity of the requestor. The authorization event may also include the creation/renewal of a security token (or credential). The security token may comprise attributes/properties such as, a token identifier, a user ID, a token type, a time-to-live (TTL) value, a set of privileges, and the like. The security token may be transmitted and/or stored by the token-generating authority, a resource provider or a SSO access control system/utility.

At decision operator 510, the success of an authorization event may be determined. In aspects, a collection creation application/service may monitor or maintain authorization event described in operation 508. If the collection creation application/service determines that the authorization event is successful (e.g., a valid authorization has been identified), flow proceeds operation 506, as described above. If the collection creation application/service determines that the authorization event is unsuccessful, flow proceeds operation 512. At operation 512, the collection creation application/service may receive or generate an indication that the authorization event was unsuccessful. The collection creation application/service may use the received/generated indication to determine whether to provide access to one or more isolated collection.

Figure 6:
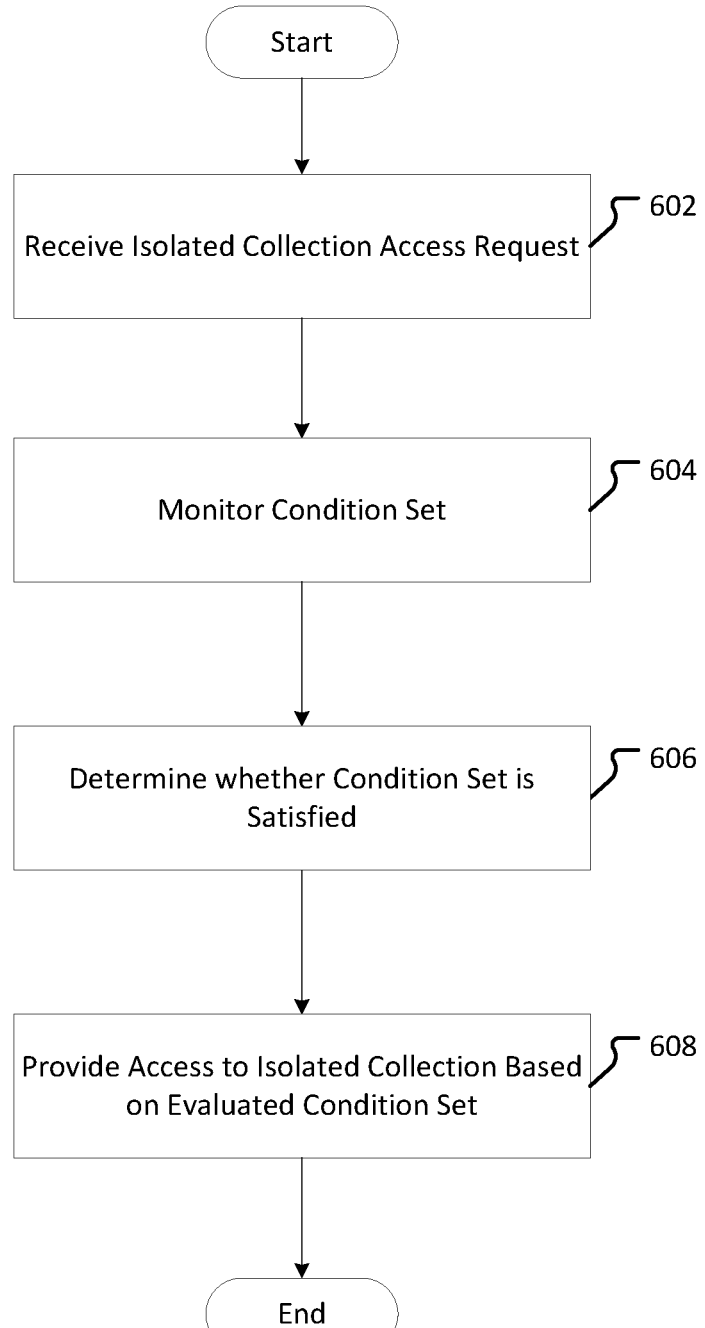
FIG. 6 illustrates an example method of conditionally authorizing access to isolated collections of data as described herein.

FIG. 6 illustrates an example method 600 of conditionally authorizing access to an isolated collection. Exemplary method 600 begins at operation 602 where a request to access one or more isolated collections, such as Sets 208 and 210, may be received by a collection creation application/service, such as Set creation applications 202 and 204, for developing and exploring isolated collections. In aspects, a collection creation application/service may be installed on, or accessible by, a computing device, such as client devices 102A-C. The collection creation application/service may have access to one or more files or directories comprising information, such as resource identifiers, resource types, resource metadata, relationship information, one or more rule sets, one or more statistical or predictive models, permission data, authorization information, query data, one or more query models, graphical components, resource mapping data, etc. The collection creation application/service may be accessible via an interface, such as a graphical user interface, a command line interface, an API, etc. In examples, a request to generate and/or access one or more isolated collections and/or associated information may be received by the collection creation application/service via the interface. The request may be in the form a query, as described above with respect to FIGS. 3B-E. In another example, the request may be in the form of a selection of a menu, a menu item, an object, a property/attribute, a portion of a graph or graphical object, etc. The request may comprise request data, such as client data (e.g., user name, password, device name, IP address, an authorization indication, etc.), isolation collection data, file system locations, etc. An isolated collection may comprise resource identifiers, relationship information and/or metadata from one or more portions of the files or directories described above. An isolated collection may be subject to the various security permission or boundaries. In examples, each isolated collection may contain its own set of security permissions. The security permissions may provide for varying degrees of access to the isolated collection and/or individual resources associated with the isolated collection. For instance, a first permission category may provide for full control of an isolated collection and the corresponding metadata, a second permission category may provide for read/write access to the content of the isolated collection, but no access to the corresponding metadata, and a third permission category may provide only for read access to the content of the isolated collection, but no access to the corresponding metadata. The security permissions may be checked upon access to the isolated collection as well as upon access to the file or directories implicated by the isolated collection. The security permissions may be stored as part of the metadata of an isolated collection. In aspects, access to the isolated collection does not necessarily imply access from the isolated collection to the underlying resources represented by the resource identifiers in the isolated collection. That is, a user or group having access to a resource identifier in an isolated collection may not be able to access the underlying resource from the isolated collection. In such aspects, the security permissions of an isolated collection may be separate and distinct from the security permissions of underlying resources associated with the isolated collection.

At operation 604, a condition set may be monitored. In aspects, a condition set may be associated with an isolated collection. The condition set may comprise one or more conditions for, as an example, conditionally authorizing access to the isolated collection. Conditions may be internal to an isolated collection, external to an isolated collection, or some combination thereof. The collection creation application/service may have access to the condition set. For example, a resource provider may publish the condition set to a location accessible by the collection creation application/service. As another example, a resource provider may register the condition set with the collection creation application/service. As yet another example, a resource provider may register the condition set with a service for monitoring conditions. The service may be operable to organize and/or monitor conditions, and may serve as a single condition monitoring access point for the collection creation application/service. As still another example, the condition set may be manually entered into the collection creation application/service. In aspects, the condition set may be monitored by the collection creation application/service, one or more resource providers, or a condition monitoring service. Monitoring the condition set may include registering one or more conditions in the condition set with one or more sensors of a computing device, such as client devices 102A-C. For example, a condition to detect entry into a specific geolocation may be registered with the GPS of a mobile device. Monitoring the condition set may also include registering one or more conditions with one or more applications or services. For example, a condition to detect the modification of a file may be registered with a cloud-based word processing application. Monitoring the condition set may also include storing the criteria for successfully completing the condition set. For example, the completion criteria for a condition set may indicate that three of the four conditions in a condition set must be satisfied to complete the condition set.

At operation 606, the status of a condition set may be determined. In aspects, one or more conditions in a condition set may be evaluated by a condition-evaluating entity (e.g., a collection creation application/service, a conditioning evaluating service, one or more resource providers, etc.) to determine whether a condition set has been satisfied/completed. Evaluating a condition set may include polling data sources (e.g., resource providers, resources, applications, services, sensors, an authentication system, a claims-based identity system, etc.) to receive sensor data, condition statuses, data updates, etc. A claims-based identity system, as used herein, may refer to a system wherein claims describing the capabilities associated with an entity in the system are packaged into one or more tokens and used to access one or more resources. Polling may be performed manually, at specified intervals, in response to certain events, or randomly. Alternately, sensor data, condition statuses and/or updates thereto may be pushed to a condition-evaluating entity by data sources. Evaluating a condition set may also include determining whether a condition set or one or more condition has been satisfied. In examples, such a determination may comprise comparing received polling information to one or more thresholds, performing pattern matching techniques, evaluating a permission set, evaluating group members, supplying polling information to a machine learning model, analyzing user signals (e.g., GPS coordinates, IP address, date/time, user input, etc.), and the like.

At operation 608, access to an isolated collection may be provided. In aspects, the collection creation application/service may authenticate access to an isolated collection based one or more satisfied conditions or condition sets. For example, a collection creation application/service may receive an indication that each condition in a condition set has been satisfied. As a result, the collection creation application/service may authenticate access to the requested isolated collection. As another example, collection creation application/service may receive an indication that less than all of the conditions in a condition set has been satisfied. As a result, the collection creation application/service may not authenticate access to the requested isolated collection and/or provide an indication of the incomplete conditions to the requestor. Generally, if a collection creation application/service determines to provide access to an isolated collection, the requestor is only provided access to the requested set. In some aspects, however, if a collection creation application/service determines to provide access to an isolated collection, the requestor may also be provided access to one or more additional isolated collections comprising the resource identifier of the underlying resource for which access was determined. In at least one aspect, a collection creation application/service may perform access conflict resolution, as described above with respect to FIG. 4. For example, access to an isolated collection may be governed by a first condition set and a second condition set. A collection creation application/service may determine that the requestor has successfully completed the first condition set, but has not completed the second condition set. As a result, the collection creation application/service may apply a set of access resolution rules that resolve such a conflict.

Figure 7:
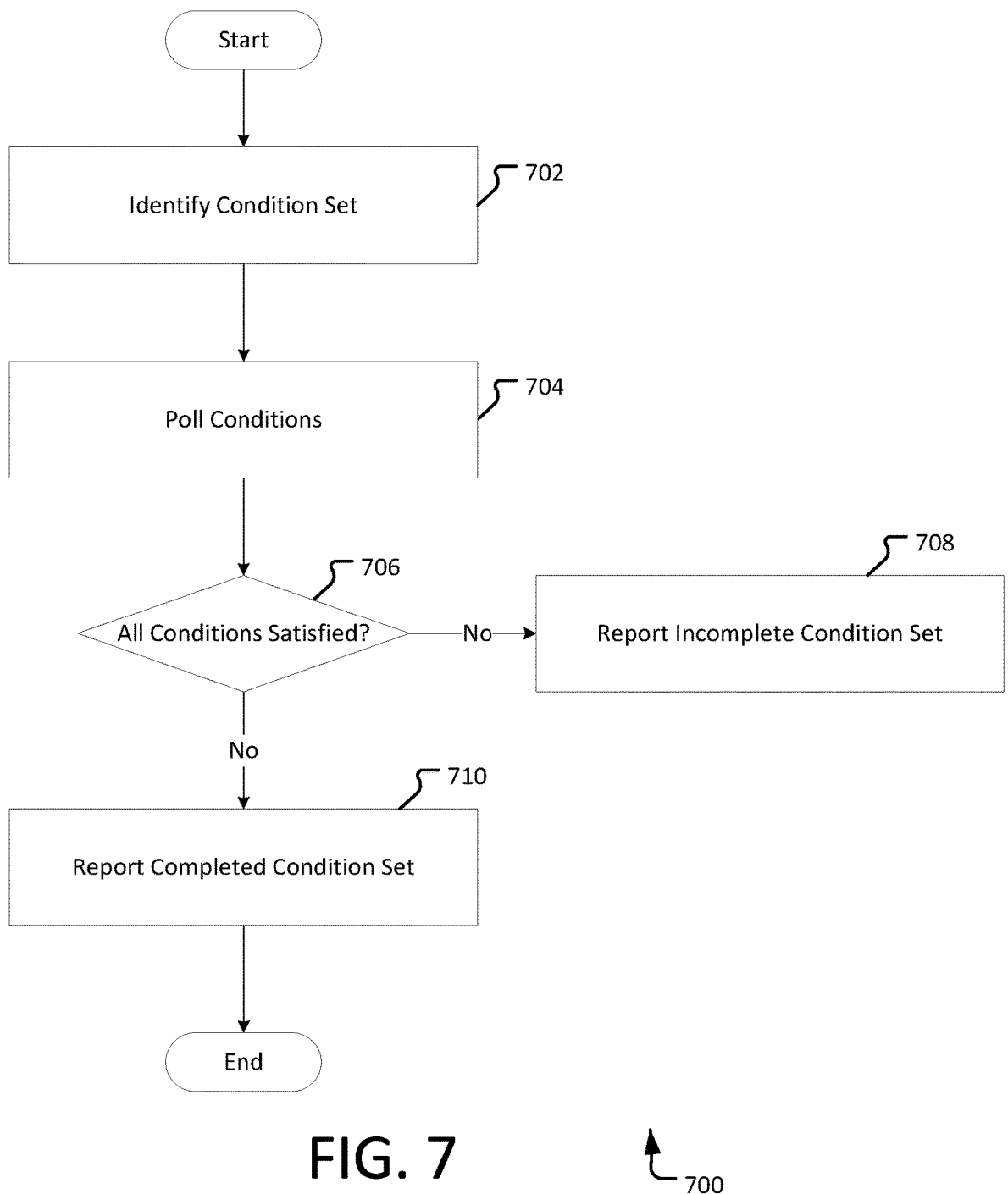
FIG. 7 illustrates an example method of determining whether conditions to access an isolated collection have been satisfied as described herein.

FIG. 7 illustrates an example method 700 of determining whether conditions to access an isolated collection have been satisfied. Exemplary method 700 begins at operation 702 where a condition set for accessing an isolated collection is identified. In aspects, the condition set may comprise one or more conditions and be associated with criteria for satisfying the condition set. For example, company ABC may establish a condition set for accessing an isolated collection. The condition set may comprise the following conditions: 1) the requestor is a member of the 'admin' group and 2) the requisite training course is complete; and 3) the requestor is a member the 'HR' group. The corresponding condition set satisfaction criteria may indicate that either condition 1) must be completed or conditions 2) and 3) must be completed.

At operation 704, conditions may be polled. In aspects, a condition-evaluating entity may poll one or more data sources (e.g., resource providers, resources, applications, services, sensors, etc.) to receive polling data (e.g., sensor data, event data, condition statuses, etc.) for conditions in a condition set. For example, a creation application/service may be registered to poll a company ABC account information database for account and/or permission data. Polling the company ABC database may comprise sending query statements comprising the account name of the requestor when a request to access an isolated collection is received. The creation application/service may also be configured to parse data from a company DEF website. Company DEF may publish training course information (e.g., course name, completion status, score, completion date, registrant information, etc.) to the website every Tuesday and Friday morning.

At decision operation 706, conditions may be evaluated. In aspects, a condition-evaluating entity may determine whether polling data satisfies one or more conditions. This determination may include comparing received polling data to one or more thresholds, performing pattern matching techniques, evaluating a permission set, evaluating group participants, supplying polling information to a machine learning model, etc. For example, a creation application/service may use a pattern matching technique to search account information retrieved from company ABC's database for a user name matching (or approximately matching) that of a requestor (e.g., a user requesting access to an isolated collection). Additionally, the creation application/service may provide the URL of the website Company DEF uses to publish training course information to a machine learning model. The machine learning model may analyze the website to determine whether a requestor is among a list of training course graduates and/or participants.

In aspects, if a condition-evaluating entity determines that one or more conditions of a condition set are not satisfied, flow proceeds to operation 708. At operation 708, an indication that the condition set has not been satisfied may be provided/recorded. In aspects, the condition-evaluating entity may update the condition set to reflect the results of the most recent monitoring/polling cycle. The condition-evaluating entity may also provide an update of the one or more failed conditions to the requestor. For example, if the creation application/service determined that the requestor is in the 'HR' group, but has not passed the requisite training course, the creation application/service may report the incomplete training course condition to the requestor. If, however, a condition-evaluating entity determines that all of conditions of a condition set are satisfied, flow proceeds to 710. At operation 710, an indication that the condition set has been satisfied may be provided/recorded. In aspects, a condition-evaluating entity may update the condition set and provide a success indicator to the requestor. For example, if the creation application/service determines that the requestor is in the 'admin' group, but has not passed the requisite training course, the creation application/service may report to the requestor that the condition set is complete. In at least example, the creation application/service may also provide the status of each condition in the condition set to the requestor.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
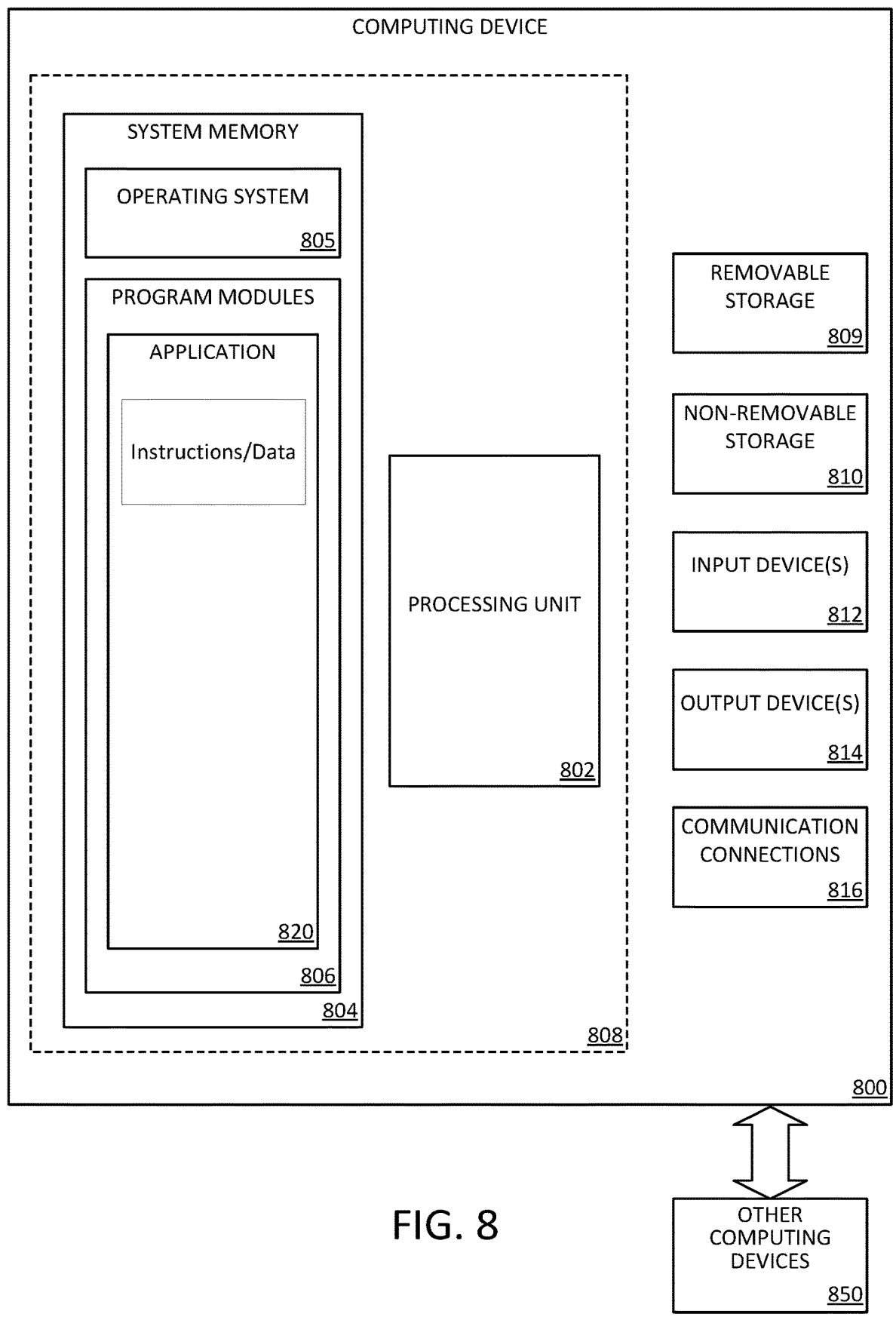
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including the client computing devices 102A-C and the server computing devices 106A-C. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for running software application 820, such as one or more components supported by the systems described herein. As examples, system memory 804 may store isolated collection data (e.g., resource identifiers, resource metadata, relationship information, asserted/inferred relationships, graphical mapping information, query data, rule sets, such as, for example, inference rules, authorization information, authentication information, etc.) and instructions for executing delegated authentication for isolated collections. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
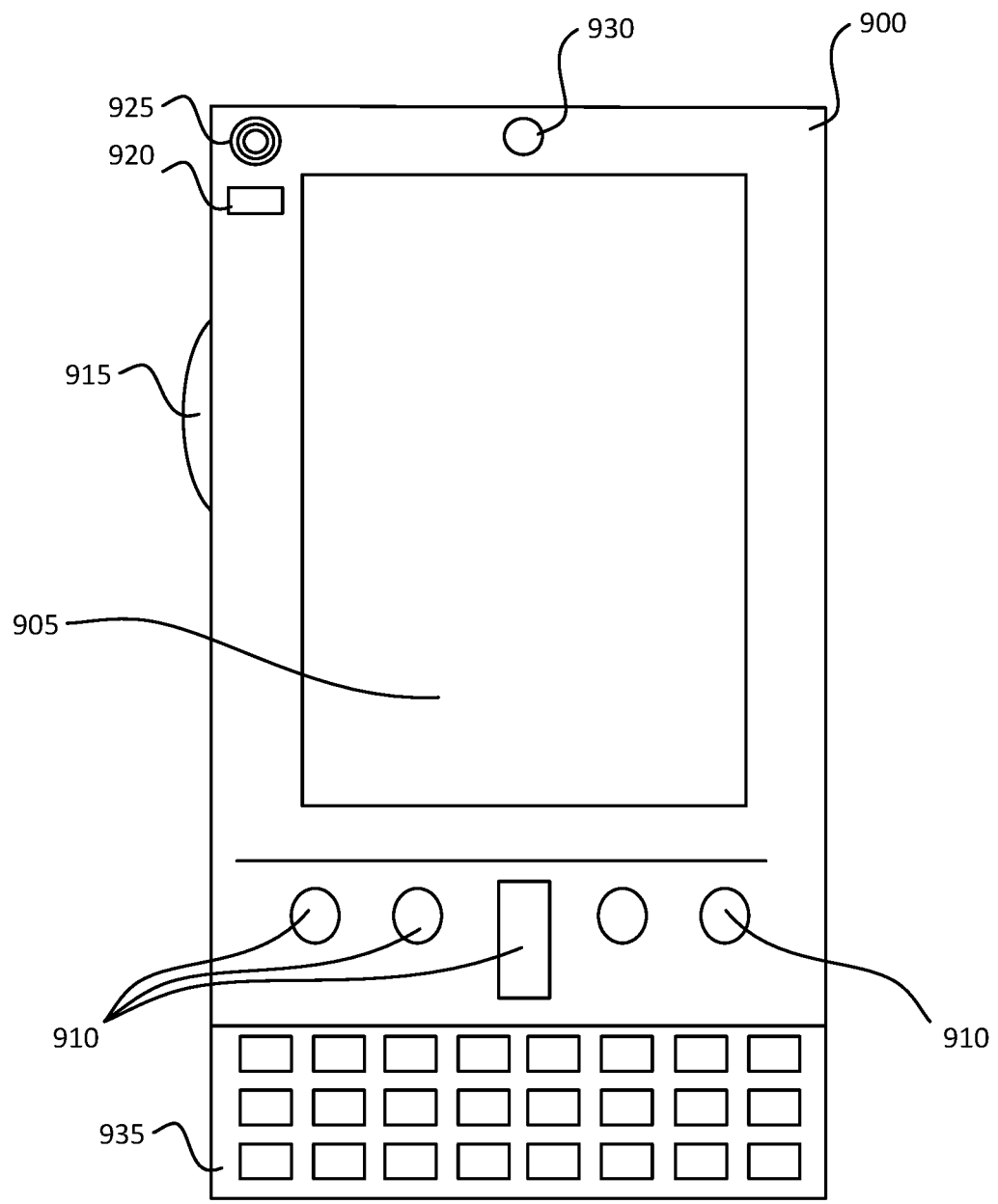
FIGS. 9A and 9B are simplified block diagrams of a mobile computing device with which aspects of the present disclosure may be practiced.
Figure 9B:
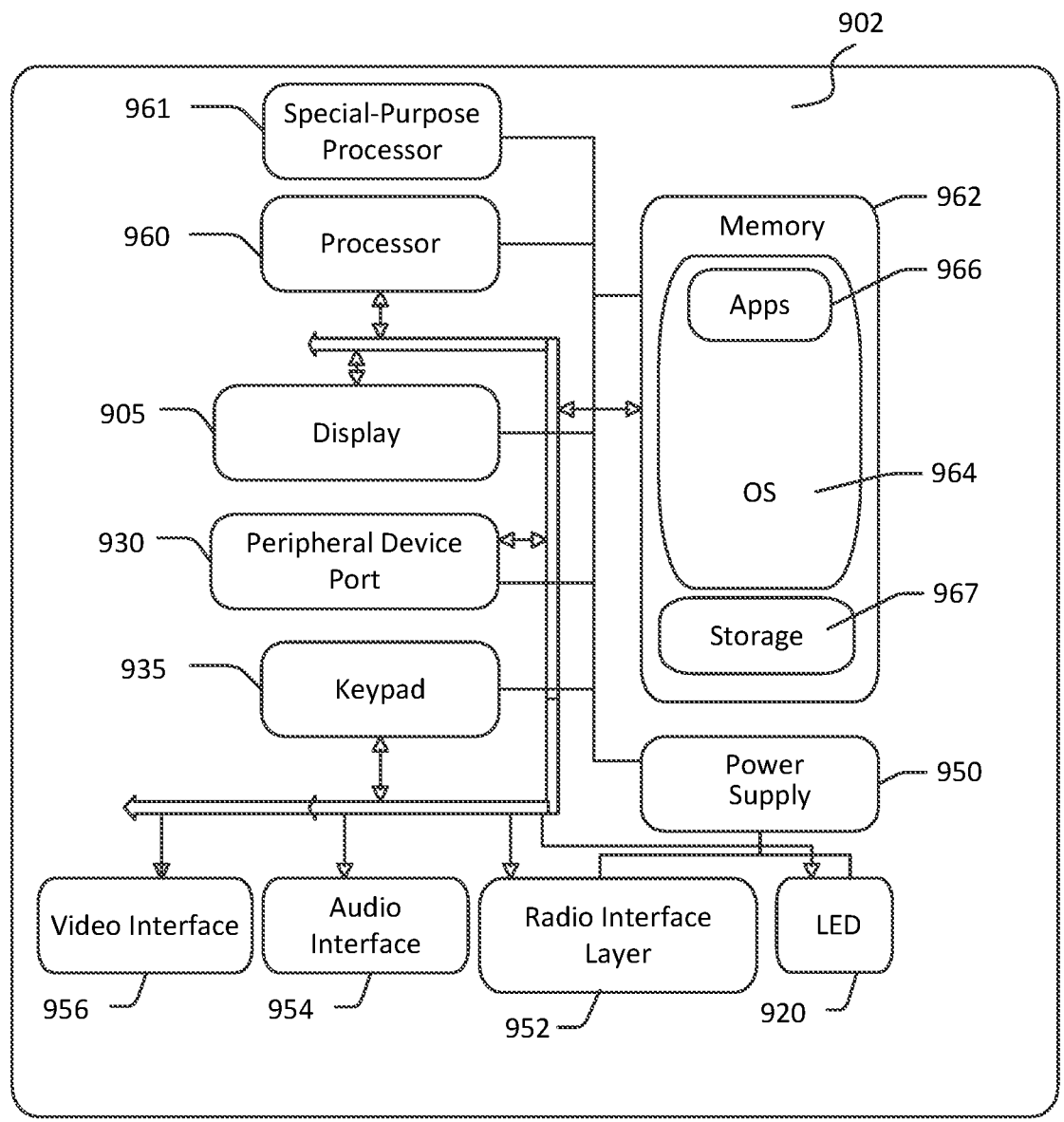

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated embodiment, the visual indicator 920 is a light emitting diode (LED) and the audio transducer 925 is a speaker. These devices may be directly coupled to the power supply 970 so that when activated, they remain on for a duration dictated by the notification mechanism even though the processor(s) (e.g., processor 960 and/or special-purpose processor 961) and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
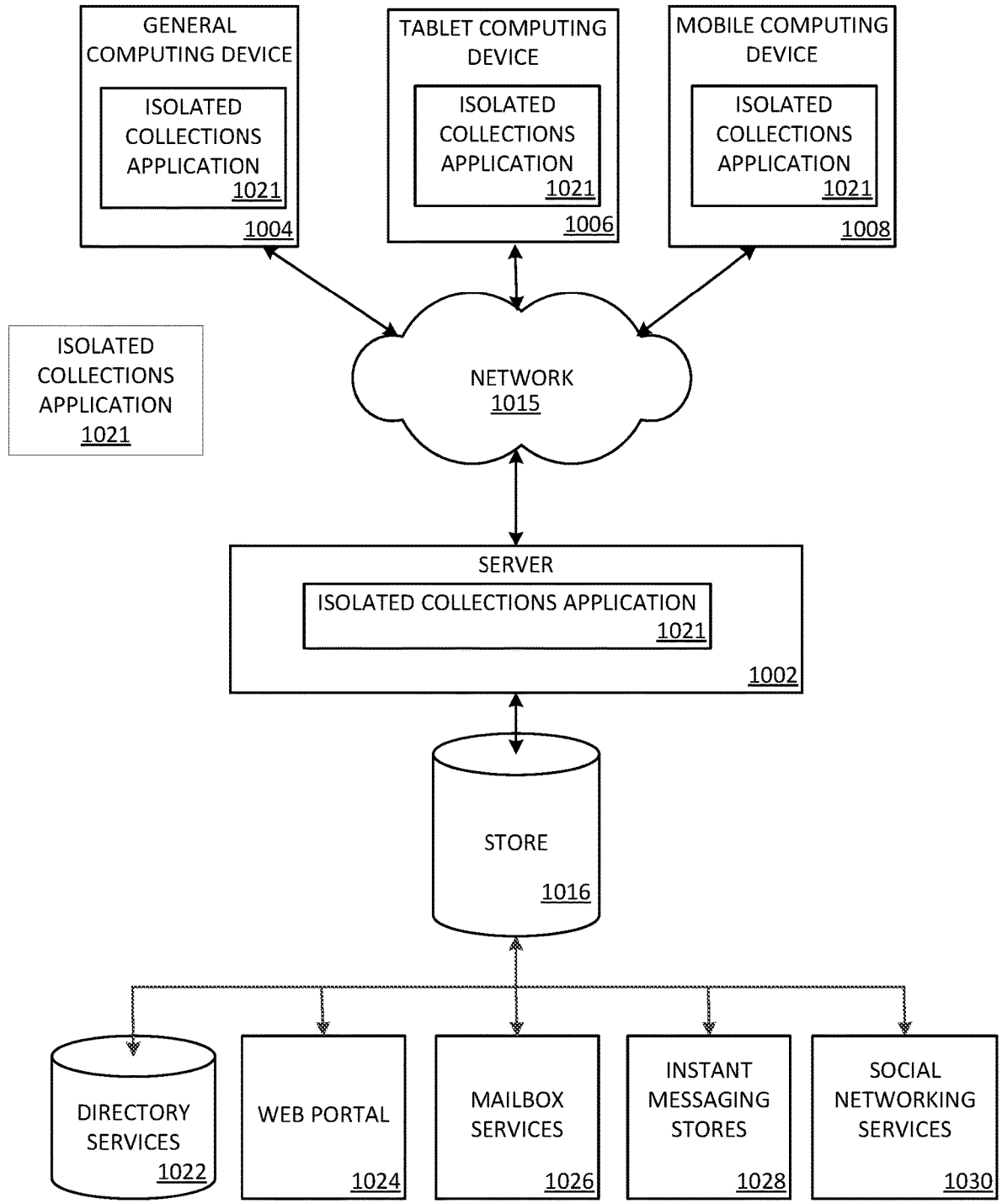
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. An isolated collections application 1021 may be employed by a client that communicates with server device 1002, and/or the isolated collections application 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data useable to be either pre-processed at a graphic-originating system, or post-processed at a receiving computing system.

Figure 11:
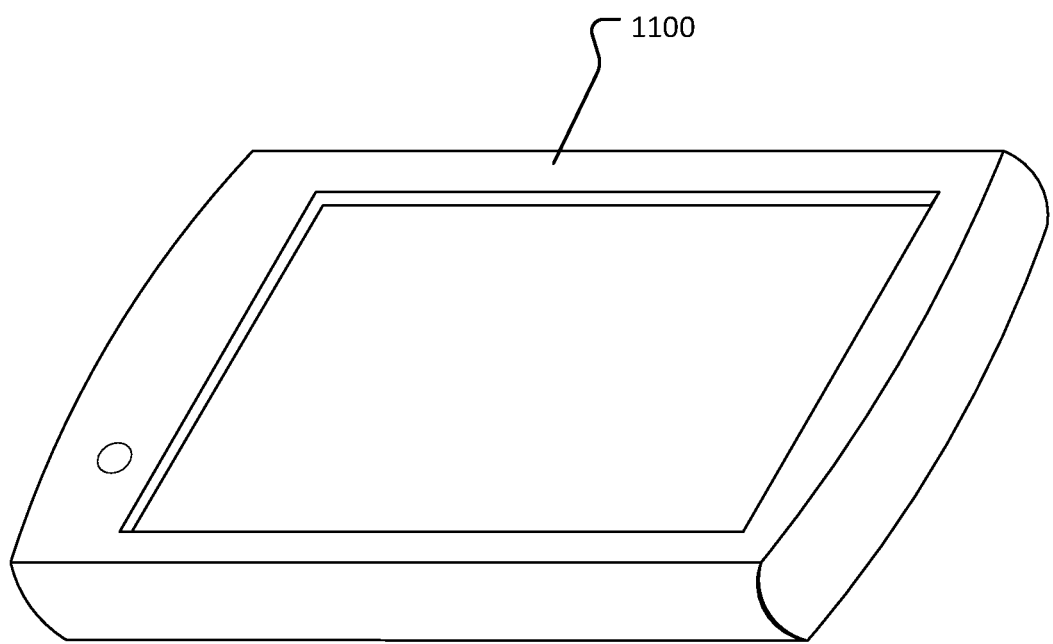
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory coupled to the at least one processor, the memory comprising computer executable instructions that, when executed by the at least one processor, performs a method comprising:

receiving, from a requestor, a request to access a graph database comprising a resource identifier, wherein access to the graph database is based on a first set of security permissions;

locating an underlying resource corresponding to the resource identifier, wherein access to the underlying resource is based on a second set of security permissions;

determining whether the requestor satisfies the second set of security permissions, wherein determining whether the requestor satisfies the second set of security permissions comprises sending a credential associated with the requestor to a resource provider associated with the underlying resource; and when the requestor satisfies the first set of security permissions and does not satisfy the second set of security permissions, providing access to the graph database without providing access to the underlying resource.

2. The system of claim 1, wherein the request is received by an application comprising an interface, wherein the interface is operable to enable development and navigation of one or more graph databases.

3. The system of claim 1, wherein locating an underlying resource comprises at least one of:
using one or more communication protocols to perform a call to the resource identifier;
providing the resource identifier to a search utility;
querying the resource provider for a list of accessible resources; and
querying a network appliance for a list of resource locations.

4. The system of claim 1, wherein determining whether access to the underlying resource is authorized comprises comparing account information associated with the requestor with account information associated with a single sign on (SSO) system.

5. The system of claim 1, wherein determining whether access to the underlying resource is authorized comprises comparing account information associated with the requestor with account information associated with the resource provider.

6. The system of claim 1, wherein determining whether access to the underlying resource is authorized comprises at least one of identifying an authorization indication, analyzing one or more authorization events, and analyzing a set of permissions.

7. The system of claim 1, wherein the graph database comprises a separate set of security permissions such that providing access to the graph database does not additionally provide access to a separate graph database comprising the resource identifier.

8. The system of claim 1, further comprising, upon determining that access to the underlying resource is not authorized, attempting to authenticate the access, wherein attempting to authenticate the access comprises requesting a token-issuing authority to provide a valid authorization indication and providing the valid authorization indication to one or more resource providers.

9. The system of claim 1, wherein providing access to the graph database comprises evaluating an access resolution rule, wherein the access resolution rule indicates that access to the graph database is provided if access is authorized to at least one underlying resource corresponding to a respective resource identifier in the graph database.

10. A method for delegating authorization to access a graph database, the method comprising:

receiving, from a requestor, a request to access a graph database comprising a resource identifier, wherein access to the graph database is based on a first set of security permissions;

locating an underlying resource corresponding to the resource identifier, wherein access to the underlying resource is based on a second set of security permissions;

determining whether the requestor satisfies the second set of security permissions, wherein determining whether the requestor satisfies the second set of security permissions comprises sending a credential associated with the requestor to a resource provider associated with the underlying resource; and when the requestor satisfies the first set of security permissions and does not satisfy the second set of security permissions, providing access to the graph database without providing access to the underlying resource.

11. The method of claim 10, wherein the request is received by an application comprising an interface, wherein the interface is operable to enable development and navigation of one or more graph databases.

12. The method of claim 10, wherein locating an underlying resource comprises at least one of:
using one more communication protocols to perform a call to the resource identifier;
providing the resource identifier to a search utility;
querying the resource provider for a list of accessible resources; and
querying a network appliance for a list of resource locations.

13. The method of claim 10, wherein determining whether access to the underlying resource is authorized comprises comparing account information associated with the requestor with account information associated with a single sign on (SSO) system.

14. The method of claim 10, wherein determining whether access to the underlying resource is authorized comprises comparing account information associated with the requestor with account information associated with the resource provider.

15. The method of claim 10, wherein determining whether access to the underlying resource is authorized comprises at least one of identifying an authorization indication, analyzing one or more authorization event files, and analyzing a set of permissions.

16. The method of claim 10, wherein the graph database comprises a separate set of security permissions such that providing access to the graph database does not additionally provide access to a separate graph database comprising the resource identifier.

17. The method of claim 10, further comprising, upon determining that access to the underlying resource is not authorized, attempting to authenticate the access, wherein attempting to authenticate the access comprises requesting a token-issuing authority to provide a valid authorization indication and providing the valid authorization indication to one or more resource providers.

18. The method of claim 10, wherein providing access to the graph database comprises evaluating an access resolution rule, wherein the access resolution rule indicates that access to the graph database is provided if access is authorized to at least one underlying resource corresponding to the resource identifier in the graph database.

19. A hardware device storing computer executable instructions that when executed cause a computing system to perform a method comprising:

receiving, from a requestor, a request to access a graph database comprising a resource identifier, wherein access to the graph database is based on a first set of security permissions;

locating an underlying resource corresponding to the resource identifier, wherein access to the underlying resource is based on a second set of security permissions, and wherein locating the underlying resource comprises at least one of:

using one more communication protocols to perform a call to the resource identifier;

providing the resource identifier to a search utility;

querying a resource provider for a list of accessible resources; and querying a network appliance for a list of resource locations;

determining whether access to the underlying resource is authorized, wherein determining whether access to the underlying resource is authorized comprises sending a credential associated with the requestor to the resource provider associated with the underlying resource; and when the requestor satisfies the first set of security permissions and does not satisfy the second set of security permissions, providing access to the graph database without providing access to the underlying resource.

20. The hardware device of claim 19, wherein determining whether access to the underlying resource is authorized comprises comparing account information associated with the requestor with account information associated with at least one of: a single sign on (SSO) system and the resource provider.

* * * * *